(12) United States Patent
Destoumieux et al.

(10) Patent No.: US 8,668,655 B2
(45) Date of Patent: Mar. 11, 2014

(54) DEVICE FOR COLLECTING A TISSUE SAMPLE FROM AN ANIMAL

(75) Inventors: Jean-Jacques Destoumieux, Lescure d'Albigeois (FR); Bruno Teychene, La Plaine (FR)

(73) Assignee: Allflex Europe, Vitre (FR)

( * ) Notice: Subject to any disclaimer, the term of this patent is extended or adjusted under 35 U.S.C. 154(b) by 275 days.

(21) Appl. No.: 13/131,809

(22) PCT Filed: Jul. 31, 2009

(86) PCT No.: PCT/EP2009/059981
§ 371 (c)(1),
(2), (4) Date: Aug. 3, 2011

(87) PCT Pub. No.: WO2010/066475
PCT Pub. Date: Jun. 17, 2010

(65) Prior Publication Data
US 2011/0295148 A1 Dec. 1, 2011

(30) Foreign Application Priority Data
Dec. 10, 2008 (FR) ...................................... 08 58453

(51) Int. Cl.
*A61B 10/00* (2006.01)
(52) U.S. Cl.
USPC ........................................................ 600/564
(58) Field of Classification Search
USPC .......... 600/562–564, 567; 606/184, 185, 116; 604/198; 131/328, 248, 252–255
See application file for complete search history.

(56) References Cited

U.S. PATENT DOCUMENTS

| 5,526,822 A | 6/1996 | Burbank et al. |
| 6,070,593 A * | 6/2000 | Chase ........................... 131/328 |
| 6,659,338 B1 | 12/2003 | Dittmann et al. |
| 2008/0064983 A1 * | 3/2008 | Stromberg et al. ........... 600/567 |

FOREIGN PATENT DOCUMENTS

| JP | 2006026227 A | 2/2006 |
| WO | 2004/010773 | 2/2004 |
| WO | 2008/003693 | 1/2008 |

OTHER PUBLICATIONS

International Search Report for International Application PCT/EP/059981; report completed Nov. 6, 2009, 4 pgs.
Written Opinion for International Application PCT/.EP/059981, completed Nov. 5, 2009, 5 pgs.

* cited by examiner

*Primary Examiner* — Brian Szmal
(74) *Attorney, Agent, or Firm* — KPPB LLP

(57) ABSTRACT

The invention relates to a device for collecting a tissue sample from an animal, comprising: a collection means having at least one cutting element (21) for cutting a tissue sample from the animal, and a means for storing said sample. According to the invention, the collection means also includes a push element (23) which can move in relation to the cutting element (21) in order to push the sample into the storage means after the sample has been cut with said cutting element (21).

13 Claims, 4 Drawing Sheets

DEVICE FOR COLLECTING A TISSUE SAMPLE FROM AN ANIMAL

1. FIELD OF THE INVENTION

The field of the invention is that of the control and/or identification of animals.

More specifically, the invention pertains to the collection of tissue from an animal, especially in order to preserve cells carrying biological or biochemical characteristics of the animal, for example in order to subsequently identify the animal or detect diseases in it.

The invention enables especially the collection of tissue from cattle, sheep, pigs, goats, poultry, fish or more generally any animal species, this collection being capable of being performed with or without simultaneous placing of an identification tag.

2. PRIOR ART

In order to improve the tracking of livestock and guarantee the origin of animals intended especially for consumption, for example by detecting diseases, it is increasingly becoming the common practice to carry out one or more operations for collecting tissues from the animals concerned.

Such collection can be done directly on the animal, at its birth for example, or at the time of placing an identification tag on the animal. Other sample-collecting operations can be done throughout the animal's existence, for example in order to detect diseases or certify the animal's identity by a comparison of DNA sequences. Once collected, the sample of tissue from the animal can be therefore stored and/or sent to a laboratory for analysis.

Currently used collection techniques make it possible to collect a tissue sample from an animal when placing an identification tag which may be visual or electronic.

Unfortunately, these sample-collecting techniques call for an adaptation of existing tags, both in structure and in the materials used. These constraints may give rise to problems of behavior of the tags, such as the poor resistance of the tag or premature ageing.

Tissue-collection techniques implemented independently of the placing of an identification tag are also known. The European patent EP 1 014 861 filed on behalf of Biopsytec Gmbh illustrates an example of this technique.

As illustrated in FIG. 1, this technique relies on the use of a punch forming or comprising a cutting element 10 designed to cut out a sample 11 of tissue from the animal and collect it in a cavity or housing. To this end, the cutting element 10 has a generally circular cutting edge that works by continuous contact or is serrated.

The punch 10, fixed to a first jaw of a collecting tool such as a clamp for example, cuts out the animal's skin and gets at least partially inserted into the microtube 12 fixed to a second jaw of the tool during the actuation of the tool. The punch 10 classically has a diameter slightly smaller than that of the microtube 12 so as to serve as a plug for the microtube. The cavity that receives the sample 11 is therefore open towards the interior of the tube but closed towards the exterior of the tube so as to prevent a contamination of the sample.

Through these sample-collecting techniques, the sample 11 is directly inserted into the microtube 12 thus restricting the risk of contamination of the sample.

Unfortunately, one drawback of this technique is that hairs from the animal often remain wedged between the walls of the microtube and the punch that serves as a plug, thus giving rise to a problem of imperviousness of the receptacle. The preservation of the sample is therefore not ensured.

Furthermore, once the punch is inserted into the microtube, it is no longer possible to add any product, for example a preservative or a reagent, into the tube without having to withdraw or cut the punch.

Yet another drawback of this technique is the fact that the punch has to be manipulated in order to extract the tissue sample collected in the cavity: this operation may prove to be difficult and/or complex and entails a risk of inflicting cuts on the user.

There is therefore a need for a novel technique, without all these prior-art drawbacks, for collecting tissue from an animal.

3. SUMMARY OF THE INVENTION

The invention proposes a novel solution that does not have all these prior-art drawbacks in the form of a device for collecting tissue from an animal comprising:

collecting means having at least one cutting element designed to cut out a sample of tissue from the animal; and means for storing the sample.

According to the invention, the collecting means also include a push element that is mobile relatively to the cutting element, enabling the sample to be pushed into the storage means after it has been cut out by the cutting element.

The invention thus proposes a novel approach for collecting a sample of tissue from an animal, that is particularly simple and swift for the user and does not obligatorily require the simultaneous placing of an identification tag. Indeed, it proposes the use of two distinct elements that are mobile relatively to one another, including a cutting element to cut out the tissue sample and a push element to push the sample into the storage means.

The operations of cutting and storing tissue are therefore performed when collecting the sample.

The use of distinct elements for these two operations has many advantaged. For example, the fact of cutting out tissue and then pushing the sample into the storage means provides for efficient cutting of the sample and prevents hairs from remaining wedged between the walls and the plug of the storage means. These two distinct elements also provide for better collection. Indeed, since the cutting element is not intended to be inserted into the storage means, it is possible to increase the size of the cutting element, i.e. the length of its cutting edge, and therefore to increase the size of the collected sample.

According to one particular embodiment, the cutting element and the push element have a shape generated by revolution and have coinciding axes, the cutting element being used as a guide for the push element.

For example, the cutting element and the push element have a cylindrical shape, the diameter of the push element being slightly smaller than the diameter of the cutting element. The cutting element is an empty cylinder. Thus, the push element can move inside the cutting element in the direction of the axis of revolution until one of its ends goes beyond the cutting element at the level of its cutting edge.

The cutting element can especially be secured to a support also having a shape generated by revolution, having the same axis as the cutting element.

In particular, the cutting element or its support having a same axis of revolution and the push element comprise complementary slidingly guiding means enabling the push element to slide within the cutting element.

According to another aspect, the push element has a container containing at least one preservative. The use of such a preservative enables the drying of the sample.

According to one particular characteristic of the invention, the push element comprises a first end having a rigid bearing surface designed to be struck by an pushrod-forming element of a collecting tool. If the push element is a cylinder, this first end is a base of the cylinder, opposite a second end constituting the other base of the cylinder, designed for its part to come into contact with the sample in order to push it.

The rigidity of the bearing surface of this first end enables the push element to be put into motion when it is struck or pushed by the pushrod-forming element of the collecting tool. The push element is then guided in translation along its axis of revolution and slides through the cutting element.

The second end of the push element, designed to come into contact with the sample, can advantageously have a permeable wall, i.e. a non-impervious wall.

The permeability of the wall enables a preservative, planned in a container of the push element, to act on the sample in drying it so that it can be preserved.

In addition, the presence of a permeable wall at the second end prevents the preservative or the desiccant from being in direct contact with the sample. It is indeed preferable to avoid this contact which could change the nature of the sample and cause problems during the subsequent analysis of the sample.

For example, a non-impervious wall of this kind belongs to the group comprising:

a screen;
a partition wall perforated with at least one aperture;
a membrane.

According to another aspect of the invention, the collecting means include a removable protection element at least partially covering the cutting element.

This protection element covering the cutting element prevents a user from getting injured when handling the collecting means. It also protects the edge of the cutting element from the external environment. The protection element furthermore isolates a preservative, provided in the push element, from ambient air so that it can properly fulfill its functions after the collection of the sample.

According to another embodiment, it is the storage means that are used as a protection element. Thus, the storage means fulfill a dual function of protecting the cutting element before collection and of storing the sample after collection.

According to another aspect of the invention, the storage means include at least one aperture and the push element is capable of being introduced into the storage means during the collection so as to block the aperture.

It is thus possible to collect a sample without a risk of contaminating it. Indeed, the push element and the sample are inserted directly into the storage means, without any action by the user to manually withdraw the sample from the cutting element or insert the sample into the storage means.

According to one particular embodiment of the invention, the storage means comprise a sample tube and a tube top piece, the tube top piece comprising means for fixed joining to the push element.

In particular, the tube top piece comprises a hood perforated with a central aperture and a flange designed to take support on the rim of the tube.

The use of a tube top piece provides numerous advantages. First of all, it gives a support on which the cutting element can rest in order to accurately cut the tissues of the animal. It also enables the tube to be closed, for example by the fitting in or clipping of the push element into the tube top piece. Furthermore, the presence of such a tube top piece makes it possible to automate the opening of the tubes by the laboratories through the removal of the tube top piece so that only the sample remains inside the tube.

The invention also pertains to a set designed to identify an animal comprising:

a device to collect tissue as described here above;
at least one identification tag;

the collecting device and said at least one identification tag each bearing an identifier enabling said animal to be identified.

For example, a set of this kind includes a collecting device as described here above, a visual identification tag (an ear tag for example) and an electronic identification tag. These three elements may carry a same identification number for the animal or mutually related identifiers. In any case, these identifiers are used to encode the same piece of information, i.e. to identify the same animal.

Naturally, a set of this kind designed to identify an animal may contain solely a collecting device and a visual tag or else a collecting device and an electronic tag or else any other element or product by which it is possible to identify the animal and/or carry out genetic monitoring of the animal.

4. LIST OF FIGURES

Other characteristics and advantages of the invention shall appear more clearly from the following description of a particular embodiment, given by way of a simple illustrative and non-exhaustive example, and from the appended drawings of which:

FIG. 1 illustrates a device for collecting a sample of tissue according to the prior art;

FIGS. 2A and 2B present collecting means according to one embodiment of the invention;

Figure 5:
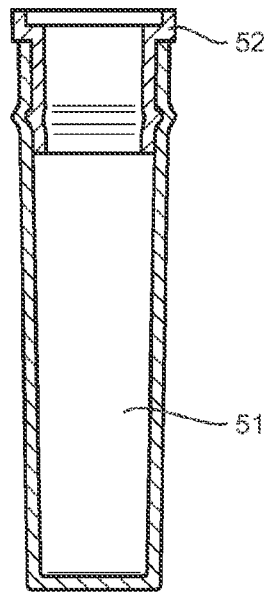
Figure 6:
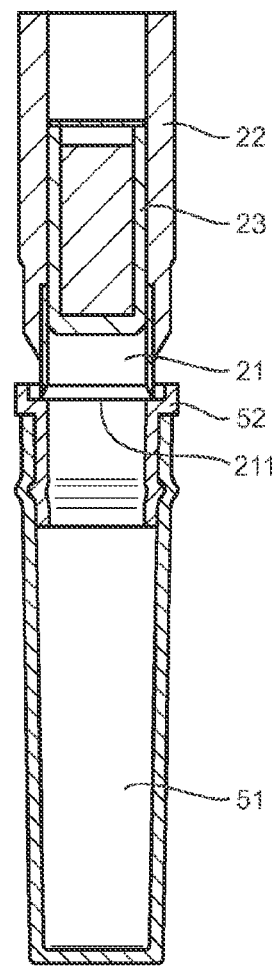
Figure 7:
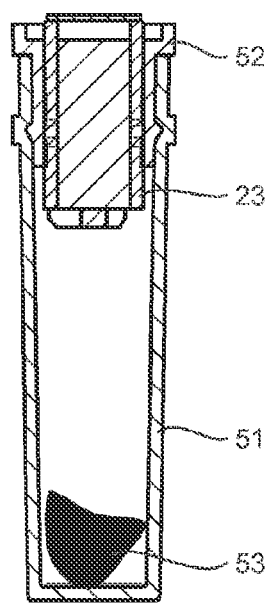

FIG. 5 presents storage means according to one embodiment of the invention;

FIG. 6 illustrates the use of the tube top piece to cut out the sample of tissue according to one embodiment of the invention;

FIG. 7 illustrates the storage means once the sample has been collected;

FIGS. 8A to 8D present an example of a collecting tool using a collecting device according to one embodiment of the invention, at different stages of sample collection.

5 DESCRIPTION OF ONE EMBODIMENT OF THE INVENTION

5.1 General principle

The general principle of the invention relies on the use of a push element, in addition to a cutting element, to collect a tissue sample from an animal. This collection can be done independently of the placing of an identification tag or in conjunction with the placing of an identification tag.

The invention thus proposes a novel device for removing tissue samples comprising means for collecting and means for storing the sample, wherein the collecting means include two distinct elements that are mobile with relation to one another, including a cutting element enabling the cutting of the tissues of the animal and a push element enabling the sample thus cut to be pushed into the storage means.

It may be recalled that the analysis of samples of tissue of an animal makes it possible especially to identify the animal or to detect disease in by this animal in the light of a microscopic examination or an extraction of a DNA sequence of cells of the sample for example.

5.2 Collecting Device

Here below, a description of one embodiment of the invention, used to collect a sample from an animal's ear for example, is provided.

A) Collecting Means

Figure 1:
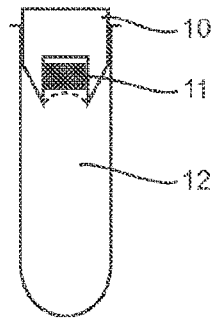
Figure 2A:
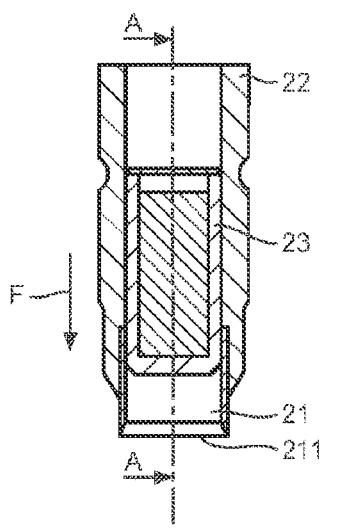
Figure 2B:
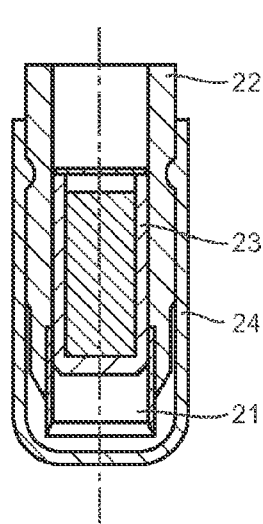

FIGS. 2A and 2B show a sectional view of the collecting means according to this embodiment, including firstly a cutting element 21 and secondly collecting a push element 23. These means can be protected at least partly by a removable protection element 24 covering at least the cutting edge of the cutting element 21.

This protection element 24 prevents the user from getting injured when handling the collecting device and protects the edge of the cutting element from the external environment. It also provides protection against ambient air to a preservative provided if necessary in a container of the push element 23.

An antiseptic can also be provided in the protection element, for example in the form of gel or foam.

The protection element 24 can also be made out of biodegradable material. Thus, once the protection element and the collecting means have been separated, the user can simply get rid of this protection element by throwing it on the ground for example while at the same time preserving the environment.

Figure 3:
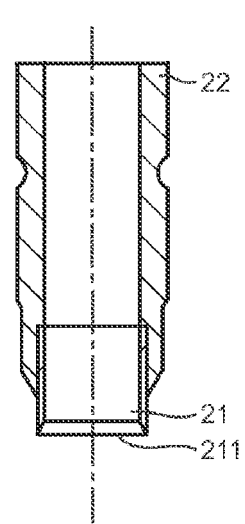
FIG. 3 illustrates an example of a cutting element secured to a support.

As illustrated in FIG. 3, the cutting element 21 can be secured to a support 22. This support 22 which can be made out of plastic, is classically mounted detachably at the end of a pushrod that is fixedly joined to one of the grips (or to a jaw) of a collecting clamp. It takes the form of a surface generated by revolution having the same axis as the cutting element 22 and the push element 23. According to one variant, the cutting element 21 and the support 22 are formed as an integral piece out of plastic or metal for example. The cutting element 21 and the support 22 are then deemed to form a single piece which is a monoblock element.

The cutting element 21 which may be metallic has a cutting edge 211 with continuous contact or with a notched or serrated form. When collecting the sample, the cutting element cuts out the animal's skin along a line corresponding to the cutting edge 211.

According to this example of an embodiment, the cutting element 21 is deemed to have a cylindrical shape generated by revolution. The cutting edge 211 then has a circular shape. Other more complex shapes can also be envisaged.

The cylinder forming the cutting element 21 is open at both ends, in order to let through the push element 23 so that this element 23 can push the sample out of the cutting element 21 and accompany it in the storage means along the direction illustrated by the arrow F.

Figure 4A:
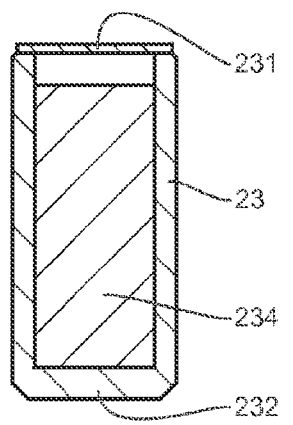
FIGS. 4A and 4B illustrate an example of a push element.

FIGS. 4A (sectional view) and 4B provide a more precise illustration of the push element 23, mobile in translation along the axis generated by revolution A-A within the cutting element 21 along the direction illustrated by the arrow F.

According to the example of an embodiment illustrated, the push element 23 also has a cylindrical shape generated by revolution. However, the diameter of the push element 23 must be smaller than that of the cutting element 21 so that the push element 23 can slide within the cylinder formed by the cutting element 21.

The cylinder forming the push element 23 is closed at least partially at both ends or bases.

Thus a first end 231 of the push element 23 has a rigid bearing surface on which a force is exerted to put the push element 23 into motion within the cutting element 21. For example, this force is exerted by means of an element forming a pushrod of a sample-collecting clamp.

A second end 232 of the push element 23 designed to come into contact with the sample has, according to the embodiment described, a wall that is permeable, i.e. non-impervious.

This wall fulfils many roles. First of all, it enables the extraction of the sample by pushing it into the storage means after it has been cut out by the cutting element. Thus, the sample is completely detached from the animal and does not stay attached to the animal by a thread or hair. This increases the efficiency of the collection through the almost certain collection of a sample during the sample-collecting operation.

Furthermore, a preservative can be provided in a container 234 of the push element 23. The permeability of the wall then enables the preservative to act on the sample while preventing this preservative from coming into direct contact with the sample.

A desiccant makes it possible especially to improve the preservation of the sample by absorbing the water contained in the sample. This desiccant is for example silica gel (trademark) or more generally a molecular screen. Different types of product based on silica, clay or the like, taking the form of beads, powder, gel, solids, liquids etc possibly impregnated with foam can therefore be used.

Figure 4B:
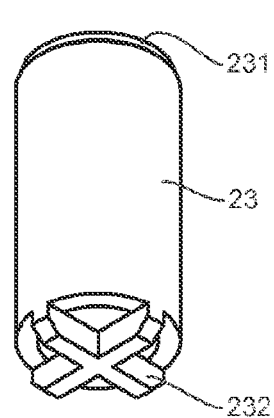

As illustrated in FIG. 4B, the wall situated at the second end 232 of the push element takes for example the shape of a cross. Other types of wall can be envisaged such as a membrane, a screen or a partition which may be hard, flexible, elastic, made of fabric, pierced with one or more crosses, one or more holes etc. It suffices that the wall should be capable of being used to push the sample out of the cutting element 21 and enable a preservative provided in the container 234 to act on the sample if such a preservative is provided.

In order to guide the push element 23 into the cutting element 21, the cutting element 21 and/or its support 22 on the one hand and the push element 23 on the other hand include complementary slidingly guiding means.

For example, the push element 23 comprises one or more guiding grooves parallel to the axis of revolution of the cutting element 21 and the push element 23. One or more strips of the cutting element 21 and/or its support 22, also parallel to the axis of revolution, can be inserted into these grooves to slidingly guide the push element 23. These strips are localized on the internal surface of the surface generated by revolution forming the support 22 and/or on the internal surface of the hollow cylinder forming the cutting element 21. Advantageously, the strips do not extend up to the cutting edge of the cutting element 21 so as not to hamper the cutting of the sample.

It is thus seen that the push element 23, liable to pass through the animal's ear, is protected by the support 22 of the cutting element 21. Thus, the user does not have to handle this cutting element 23 and therefore runs no risk of contaminating it or of contaminating the sample. It is also possible to add means to the support 22 by which the push element 23 can be held inside the support 22 like a ring or a hood perforated with a central aperture.

B) Storage Means

FIG. 5 shows a sectional view of the storage means according to this embodiment which include firstly a sample tube 51 comprising at least one aperture and secondly a tube top piece 52.

The shape of the sampling tube is considered for example to be compatible with a "rack" type sample-tube support comprising for example 24, 48 or 96 positions.

A tube top piece 52 of this kind is fixed to the inlet of the sample tube, for example by clipping or being fitted in. It can be made out of a flexible material, for example rubber, to facilitate its insertion into the neck of the tube.

More specifically, the tube top piece 52 takes the form of a hood perforated with a central aperture having a diameter sufficient to enable the insertion of at least one portion of the push element 23. The use of a flexible material for this hood also facilitates the insertion of the push element 23 into the tube 51. The push element 23 then closes the tube 51 imperviously or almost imperviously.

The tube top piece 52 also has a flange resting on the rim of the sample tube 51. The use of such a flange makes it possible especially to facilitate the placing and removal of the hood. Once the sample has been collected and the push element 23 has been at least partially inserted into the central aperture of the tube top piece 51, it is indeed possible to withdraw the tube top piece 52 and the push element 23 as a single unit in order to analyze the sample, by grasping the flange. The step for opening the sample tube 51, making it possible to uncap the tube top piece so as to leave only the sample of tissue in the tube 51, can thus be automated.

As illustrated in FIG. 6, the flange also defines a stop surface (or block) on which the cutting edge of the cutting element 21 can lean during the sample collection in order to cut the tissue sample more easily. This technique also provides for an efficient cutting of the hairs of the animal. In this way, the hairs do not hamper the closing of the tube, thus providing for better imperviousness of the tube as compared with the prior-art techniques.

As illustrated in FIG. 7, the push element 23 then pushes the sample 53 thus cut into the tube 51 and continues its motion by getting inserted into the tube top piece 52. The push element 23, fixedly joined to the tube head 52 by force-fitting for example thus hermetically or almost hermetically blocking the tube 51.

According to another embodiment, the sample tube 52 can be used as a protection element 24 according to FIG. 2B.

5.3 Sample-Collecting Tool

Here below, we describe an example of a sample-collecting tool capable of being used to collect a tissue sample using the collecting device described here above.

Such a tool generally has the shape of a clamp with two arms or handles of any unspecified nature, at least one of which is hinged. These arms act on two grips or jaws. The collecting means are secured to a pushrod-forming element of one of the grips and the storage means are secured to the other grip.

The mobile arm, which can be actuated by hand for example, acts on driving means of the pushrod-forming element in such a way as to guide the sample-collecting means in a motion of translation so that they penetrate the animal's flesh and force the collected sample into the storage means. The clamp can also be actuated by means electrical, pneumatic or other forms of energy. The sample-collecting and storage means are therefore configured to cooperate with such a tool. More specifically, the cutting element and the push element are configured to be put into motion relatively to one another by the actuating of the clamp.

The example illustrated proposes a dual-pin mechanism in which a first pin transmits a motion of translation to the cutting element or its support which perforates the ear and then a second pin transmits a motion of translation parallel to the push element so as to the push the tissue sample that has been cut out but is still situated in the cutting element and place it in the sampling tube. The path of the cutting element and of push element, through the ear is therefore rectilinear. These two motions are controlled by a single action of the user on the clamp.

FIGS. 8A to 8D provide a more precise illustration of the jaws of such a clamp, at different stages of sample collection.

Figure 8A:
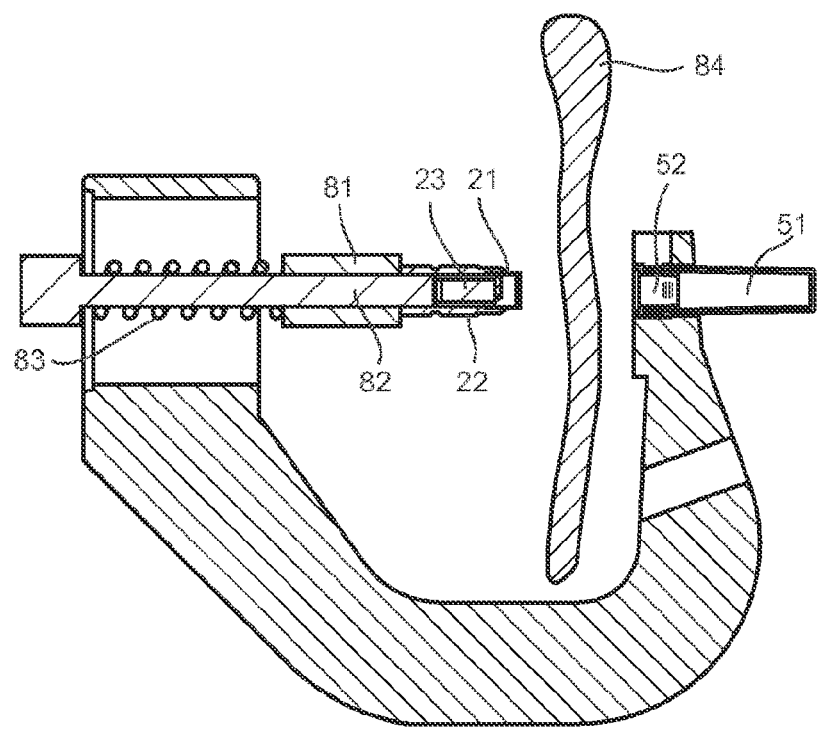

At the initial state, illustrated in FIG. 8A, the collecting means according to this embodiment of the invention comprise a cutting element 21 secured to a support 22 and a push element 23 which are mounted on a pushrod-forming element of a grip of the clamp. Such a pushrod-forming element includes for example two pushrods, called a first pushrod 81 and a second pushrod 82 and a spring 83. The two pushrods 81 and 82 slide, one in the other.

The storage means comprising a tube 51 and a tube top piece 52 according to this embodiment are mounted on the other grip of the clamp, for example on a tube support.

Thus, no element of the clamp is in direct contact with the sample collected.

If a protection element 24 protects the cutting element 21 of the sample-collecting means, it must be withdrawn before the collecting operation.

The user can then position the grips of the clamp on either side of the sample-collecting area on the animal, for example on an ear 84 of the animal.

Figure 8B:
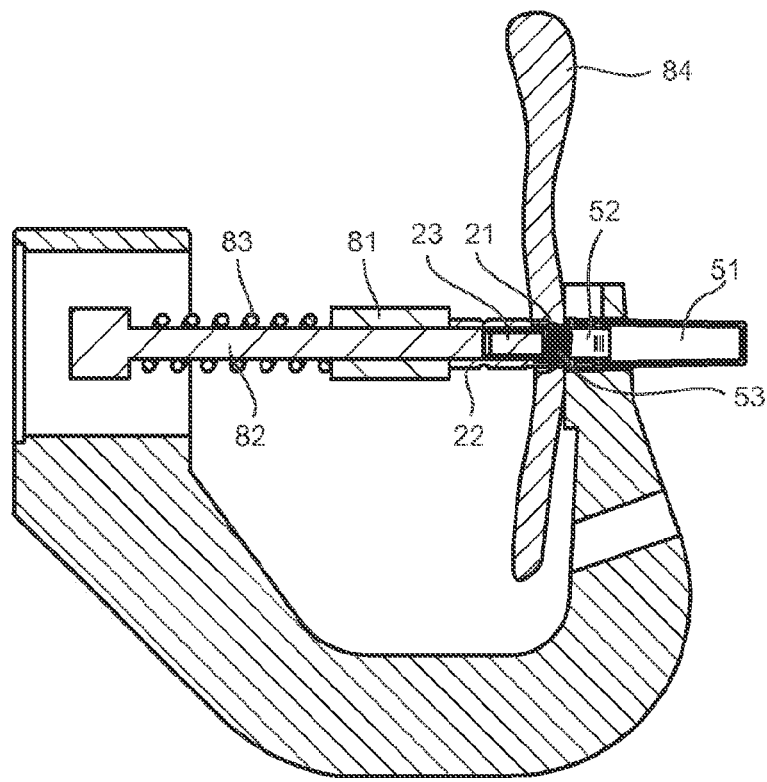

As illustrated in FIG. 8B, the user can then actuate the clamp, acting on means for driving the pushrod-forming element so as to guide the collecting means in a translation motion. The cutting element 21 then passes through the animal's ear 84, driven by the first pushrod 81 until its cutting edge takes support on the flange of the tube top piece 52 defining a stop surface or block. The cutting element 21 thus enables the cutting out of a sample 53 of the animal's ear tissue that is located within the hollow cylinder defined by the cutting element 21. In other words, the cutting element 21 acts like a punch.

When the cutting edge of the cutting element 21 abuts the flange of the tube top piece, the travel of the cutting element 21 is stopped. The spring 83, whose length is calibrated, then starts getting compressed. The compression of this spring 83 drives the second pushrod 82, translationally guided inside the first pushrod 81. The pusher 23 is then translationally guided inside the cutting element 21, driven by the second pushrod 82. When the push element 23 comes into contact with the sample 53 previously cut by the cutting element 21, it continues on its course and pushes the sample 53 into the tube 51. In other words, the push element 23 enables the extraction of the tissue sample cut out by the cutting element 21.

The mechanism transmitting the motions to the pushrods can therefore be seen as a stripping system, where the stripper bears the sample-collecting means. Such a system enables the first pushrod 81 to exert a pressure on a peripheral element of the cutting means and the second pushrod to exert a pressure on a central element of the collecting means. The peripheral element of the collecting means corresponds for example to the ring formed by the end of the support 22 or the cutting element 21 opposite the cutting edge of the cutting element 21. The central element of the sample-collecting means corresponds for example to the bearing surface 231 of the push element 23.

Figure 8C:
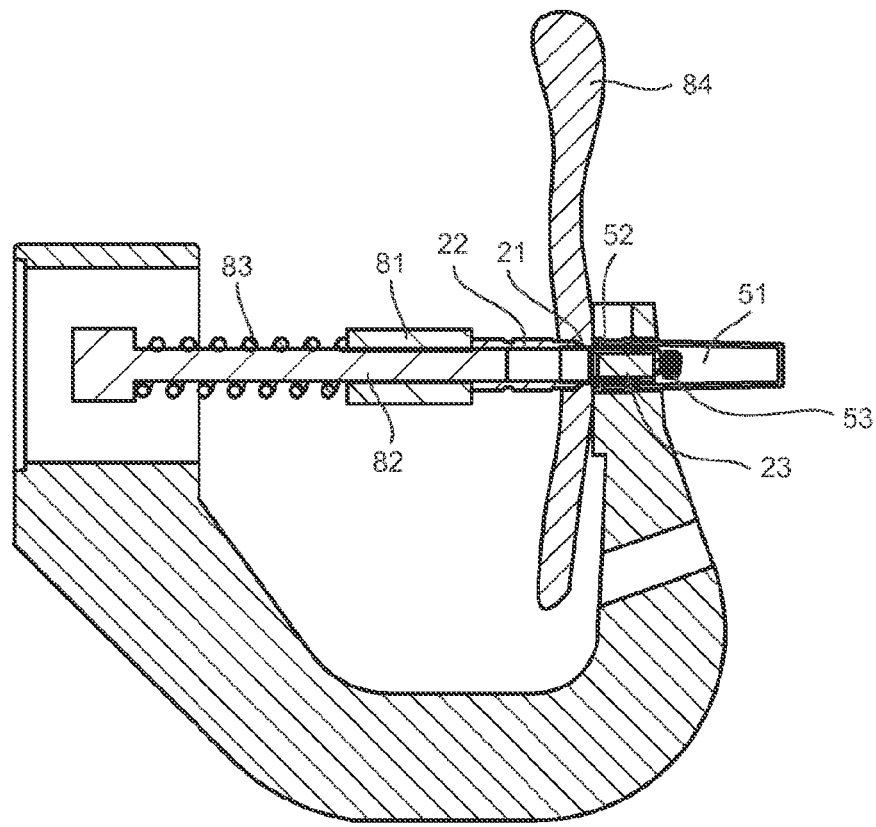

As illustrated in FIG. 8C, the push element 23 ends its course in getting fitted into the tube top piece 52 and thus hermetically or almost hermetically seals the tube 51. The push element 23 thus fulfils the function of a plug for the storage means.

Furthermore, owing to the presence of a preservative in the push element 23, the sample 53 localized in the tube 51 can be dried and kept for a period ranging from a few days to several years.

Once the storage means have been closed by the push element 23 acting like a plug, the user can relax the action exerted on the arms of the clamp.

Figure 8D:
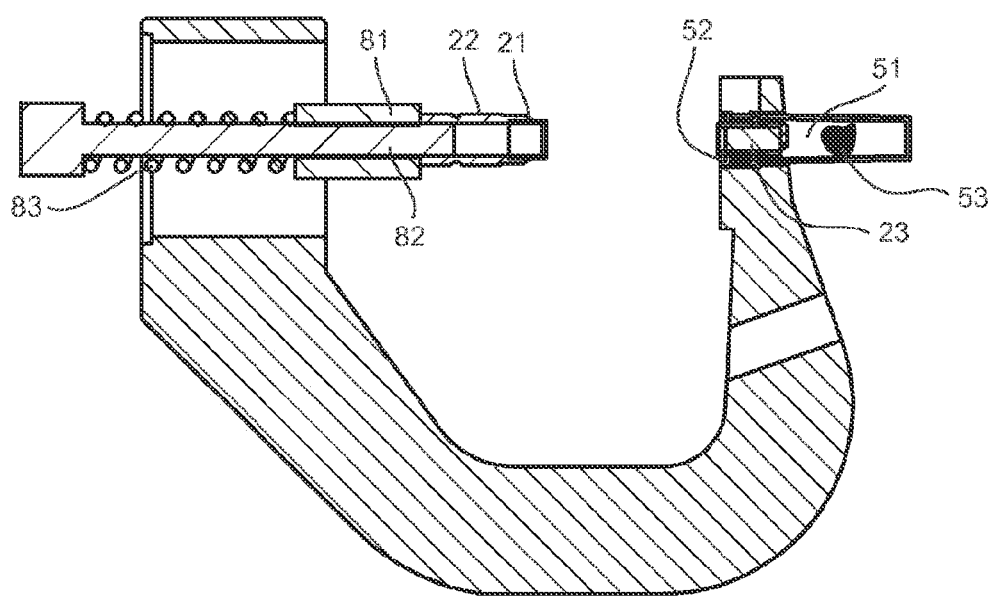

As shown in FIG. 8D, the sample tube 51 comprising the sample 53 closed by the push element 23 remains mounted on the tube support of one of the grips of the clamp.

The first pushrod 81 on which the cutting element 21 and its support 22 are mounted returns to its original position on the other grip of the clamp. Indeed, in this embodiment, the pushrod-forming element comprises means for holding the cutting element 21, to bring the cutting element back into its initial position while the push element 23 remains fixed to the tube top piece 52.

The user can then withdraw the cutting element 21 and its support 22 from the clamp, for example by actuating an ejection mechanism so as to prevent the user from touching the soiled cutting element 21 and running the risk of cutting himself. This ejection can also be implemented automatically during the return to the initial position when the user relaxes the action exerted on the arms of the clamp.

The user can also withdraw the sample tube 51 and make a visual check on the presence of a sample of tissue in this tube. To this end, at least a part of the tube is transparent.

The user can then repeat these steps on another animal or on the same animal if there is no sample in the tube.

It can be noted that it is preferable to identify the sample tube with an identification number of the animal, for example in the form of a computer-readable matrix or code. This enables especially an automated processing of the sample-collecting operation through the reading of the code or the matrix during the analysis of the sample contained in the tube.

In particular, it is possible to provide the user with a set comprising a sample-collecting device and one or more identification tags (for example visual and/or electronic identification tags).

Each element of this set has an identifier to identify a same animal by encoding the same information, possibly in different forms (for example in the form of an identification number, a barcode or a matrix code). These identifiers are therefore mutually related.

For example, the electronic and visual identification tags (ear tag for example) carry a same identification number and the sample-collecting device carries a barcode or a matrix code representing this identification number.

In this way, it is easy for a user (a breeder for example) to enter information into and/or consult data bases referencing the animals through a simple reading of the identifier present on the sampling device or on a visual identification tag or again carried by an electronic identification tag for a same set since all these identifiers make it possible to identify the same animal.

Furthermore, it is possible to obtain all the identifiers associated with a same animal (identification number, barcode, matrix code or the like) from the reading of only one of these identifiers (identification number for example) in the data base. For example, it is possible to access all the identifiers of an animal by entering one of the identifiers of the animal on the supplier's Internet site.

It is also possible to easily access genetic analyses performed on an animal by entering the animal's identifier into the data bases (for example the animal's identification number) since both the animal and the tissue-collecting device (especially the storage means) carry an identifier to identify the same animal.

Other sample-collecting tools can also be used, provided that they enable a dual motion of parallel translation of the cutting element and of the push element, slightly offset in time so that the cutting element cuts the tissues out of the animal before the push element pushes the sample thus cut. This time offset can be of the order of one nanosecond or one microsecond.

As described in the example illustrated, the mechanism transmitting the movements to the pushrods may be a stripping system. Other mechanisms can also be envisaged, for example a camshaft system comprising a first cam driving the first pushrod 81 and a second cam driving the second pushrod 82.

In another embodiment, the technique presented could be coupled with the simultaneous positioning of an identification tag. Advantageously, this identification tag carries an identifier linked to an identifier of the sample-collecting device, identifiers being used to identify a same animal by encoding the same information.

The invention claimed is:

1. A device for collecting tissue from an animal comprising:
    collecting means having at least one cutting element configured to cut out a sample of tissue from an animal, and means for storing said sample,
    wherein said collecting means also include a push element that is mobile relatively to the cutting element and configured to push said sample into said storage means after it has been cut out by said cutting element;
    wherein said storage means comprises a sample tube and a tube top piece;
    wherein said tube top piece forms a support configured for acting as a stop surface of said cutting element to cut said sample; and
    wherein said tube top piece comprises an aperture configured to allow at least one part of said push element to be inserted into the storage means to close the sample tube.

2. The collecting device according to claim 1, wherein said cutting element and said push element have a cylindrical shape and have coinciding axes, said cutting element being used as a guide for said push element.

3. The collecting device according to claim 2, wherein said cutting element and said push element comprise complementary slidingly guiding means enabling said push element to slide within said cutting element.

4. The collecting device according to claim 2, wherein:
    a support to which said cutting element is secured and said push element comprise complementary slidingly guiding means enabling said push element to slide within said cutting element; and
    said support being coaxial with the cutting element and the push element.

5. The collecting device according to claim 1, wherein said push element comprises a container containing at least one preservative.

6. The collecting device according to claim 1, wherein a first end of said push element has a rigid bearing surface designed to be struck by an pushrod-forming element of a collecting tool.

7. The collecting device according to claim 1, wherein a second end of said push element, designed to come into contact with said sample, has a permeable wall.

8. The collecting device according to claim 7, wherein said wall belongs to the group comprising:

a screen;
a partition wall perforated with at least one aperture;
a membrane.

9. The collecting device according to claim 1, wherein said collecting means include a removable protection element at least partially covering said cutting element.

10. The collecting device according to claim 1, wherein said tube top piece comprising means for fixed joining to said push element in order to obtrude said aperture.

11. The collecting device according to claim 10, wherein said tube top piece comprises a hood perforated with a central aperture and a flange designed to take support on the rim of said tube.

12. A set designed for the identification of an animal comprising:
a device comprising:
collecting means having at least one cutting element configured to cut out a sample of tissue from an animal, and
means for storing said sample,
wherein said collecting means also include a push element that is mobile relatively to the cutting element and configured to push said sample into said storage means after it has been cut out by said cutting element;
wherein said storage means comprise a sample tube and a tube top piece, said tube top piece forming a support configured for acting as a stop surface of said cutting element to cut said sample, and comprising an aperture configured to allow at least one part of said push element to be inserted into the storage means to close the sample tube; and
at least one identification tag;
said device to collect tissue and said at least one identification tag each bearing an identifier enabling said animal to be identified.

13. A sample-collecting tool configured to collect a tissue sample, comprising:
a first pushrod configured to drive a cutting element configured to cut out a sample of tissue from an animal in a translation motion until its cutting edge takes support on the flange of a tube top piece of a sample tube;
a second pushrod configured to drive a push element configured to push said sample into said sample tube in a translation motion inside the cutting element; and
a spring configured to drive the second pushrod in a translation motion inside the first pushrod when the spring gets compressed.

* * * * *